June 19, 1956  V. G. KLEIN  2,750,932
VALVE MECHANISM
Filed May 18, 1953  4 Sheets-Sheet 1

Victor G. Klein,
Inventor.
Koenig and Pope,
Attorneys.

June 19, 1956  V. G. KLEIN  2,750,932
VALVE MECHANISM

Filed May 18, 1953  4 Sheets-Sheet 3

Victor G. Klein,
Inventor.
Koenig and Pope,
Attorneys.

June 19, 1956  V. G. KLEIN  2,750,932
VALVE MECHANISM

Filed May 18, 1953  4 Sheets-Sheet 4

Victor G. Klein,
Inventor.
Koenig and Pope,
Attorneys.

United States Patent Office 2,750,932
Patented June 19, 1956

2,750,932

VALVE MECHANISM

Victor G. Klein, Defiance, Mo., assignor to Lincoln Engineering Company, St. Louis, Mo., a corporation of Missouri Application May 18, 1953, Serial No. 355,624

2 Claims. (Cl. 121—154)

This invention relates to valve mechanisms, and more particularly to a quick-acting valve mechanism for actuating the distributing valve of an expansible chamber motor, for example an air motor such as is used for driving a lubricant pump or the like.

This invention is an improvement upon the quick-acting valve mechanism for actuating the distributing valve of an expansible chamber motor shown in United States Patent 2,437,391, which utilizes the motor-driving pressure fluid to effect snap action and quick cutoff of the distributing valve at full engine stroke, without mechanical overcentering linkages or the like. Among the several objects of this invention may be noted the provision of a valve mechanism of this class wherein there is less frictional resistance to movement of operating parts of the valve mechanism, thereby reducing the fluid pressure required for operation of the valve mechanism; and the provision of a valve mechanism of this class having a longer useful life. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is an end view of a motor having a valve mechanism of this invention;

Figure 1:
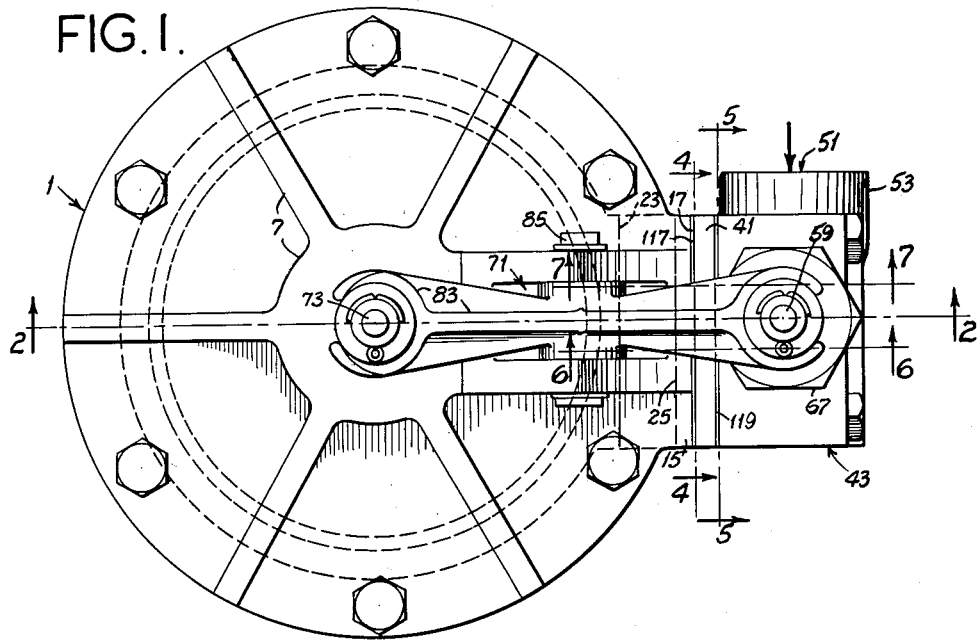
Figure 3:
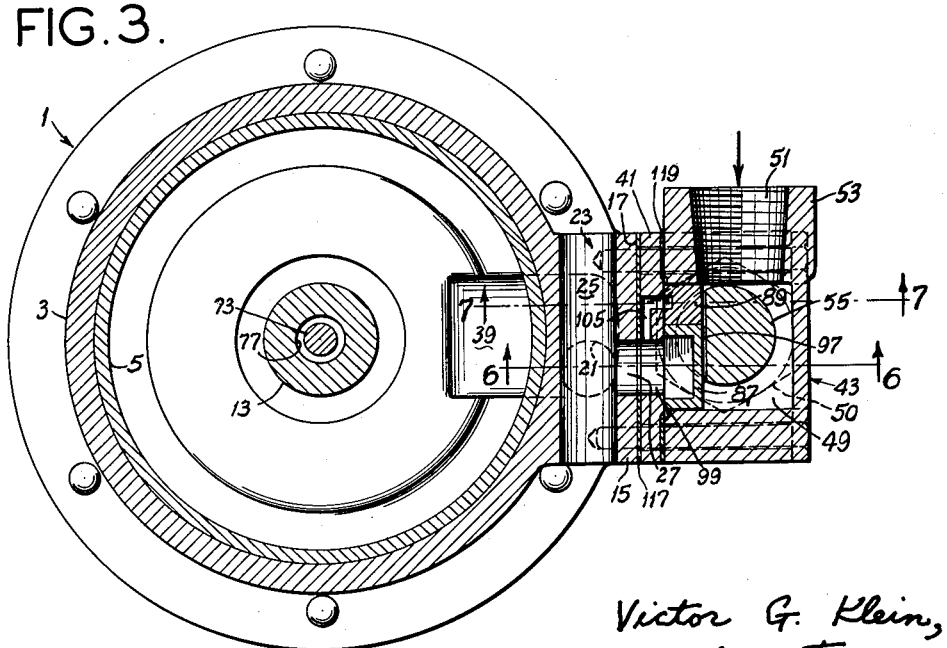
Fig. 3 is a central transverse section taken on line 3—3 of Fig. 2.
Figure 10:
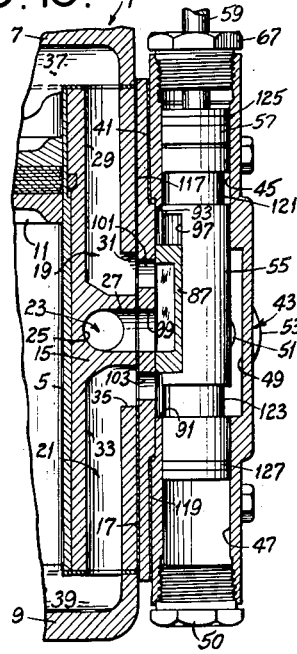
Figure 11:
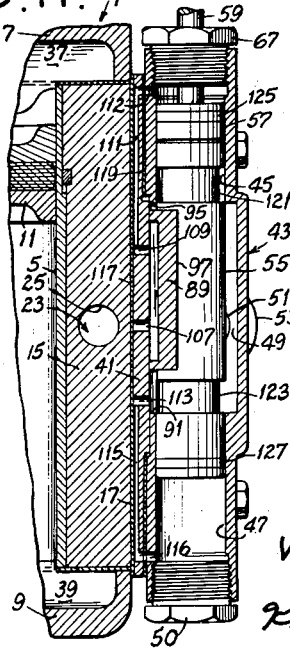
Figure 6:
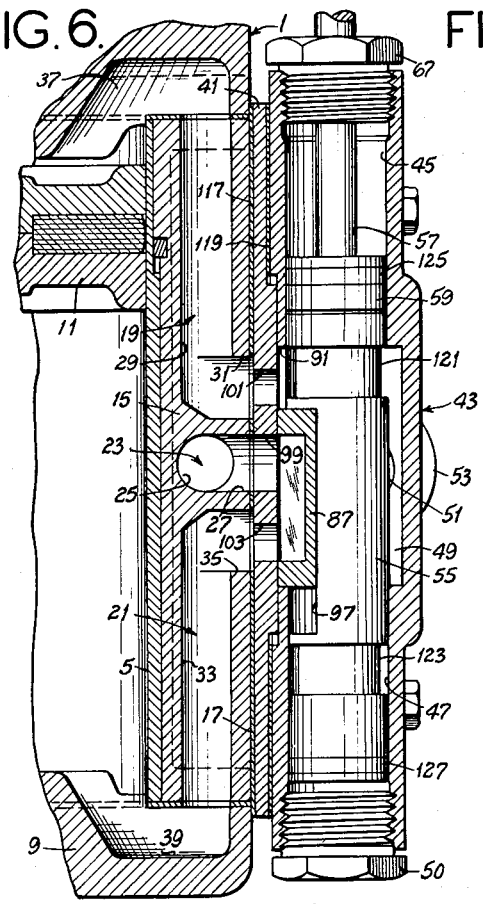
Fig. 6 is a fragmentary longitudinal section through a main distributing valve of the valve mechanism, taken substantially on line 6—6 of Figs. 1, 3, 4 and 5, illustrating parts in position corresponding to Fig. 1.
Figure 7:
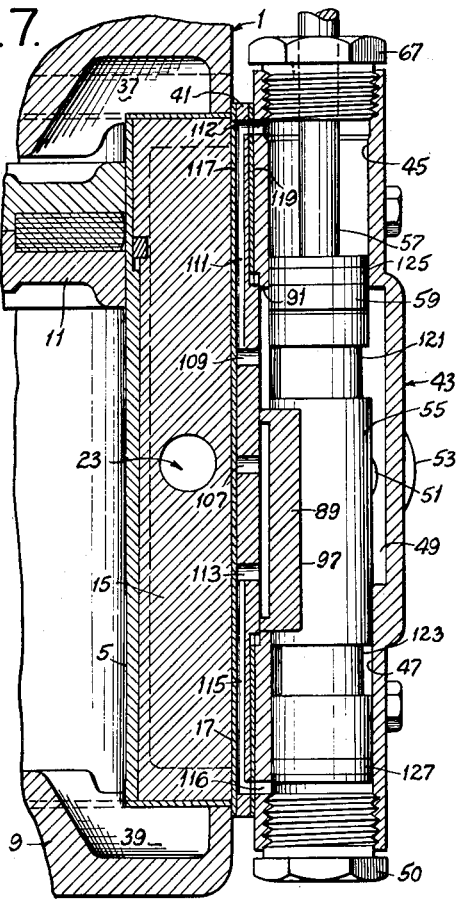
Figure 8:
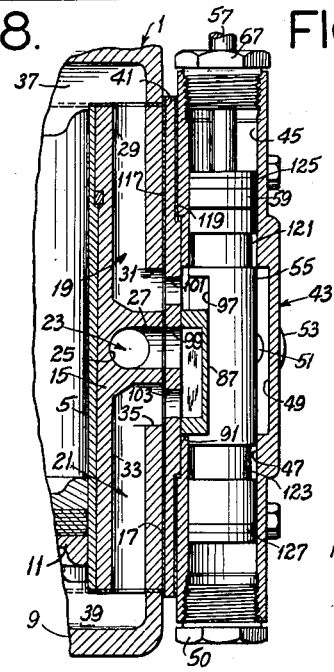
Figure 9:
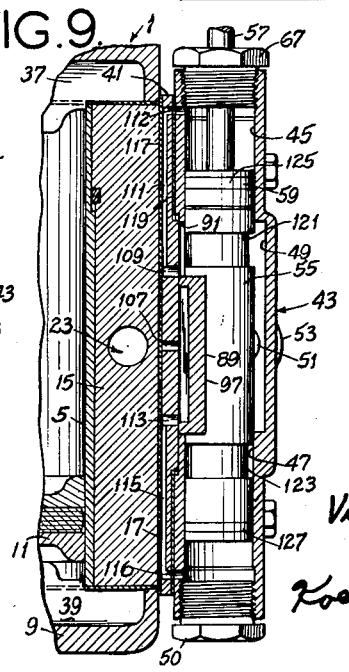

Fig. 7 is a fragmentary longitudinal section through an auxiliary valve of the valve mechanism, taken substantially on line 7—7 of Figs. 1, 3, 4 and 5, illustrating parts in position corresponding to Figs. 1 and 6;

Fig. 8 is a section corresponding to Fig. 6, but on a reduced scale, and showing parts in an intermediate position;

Fig. 9 is a section corresponding to Fig. 7, on the same scale as Fig. 8, and showing parts in the intermediate position corresponding to Fig. 8;

Fig. 10 is a section corresponding to Fig. 6, but on a reduced scale, and showing parts in the position occupied during an upstroke of the motor piston; and Fig. 11 is a section corresponding to Fig. 7, on the same scale as Fig. 10, and showing parts in the position corresponding to Fig. 10.

Corresponding reference characters indicate corresponding parts throughout the several views of the drawings.

Figure 2:
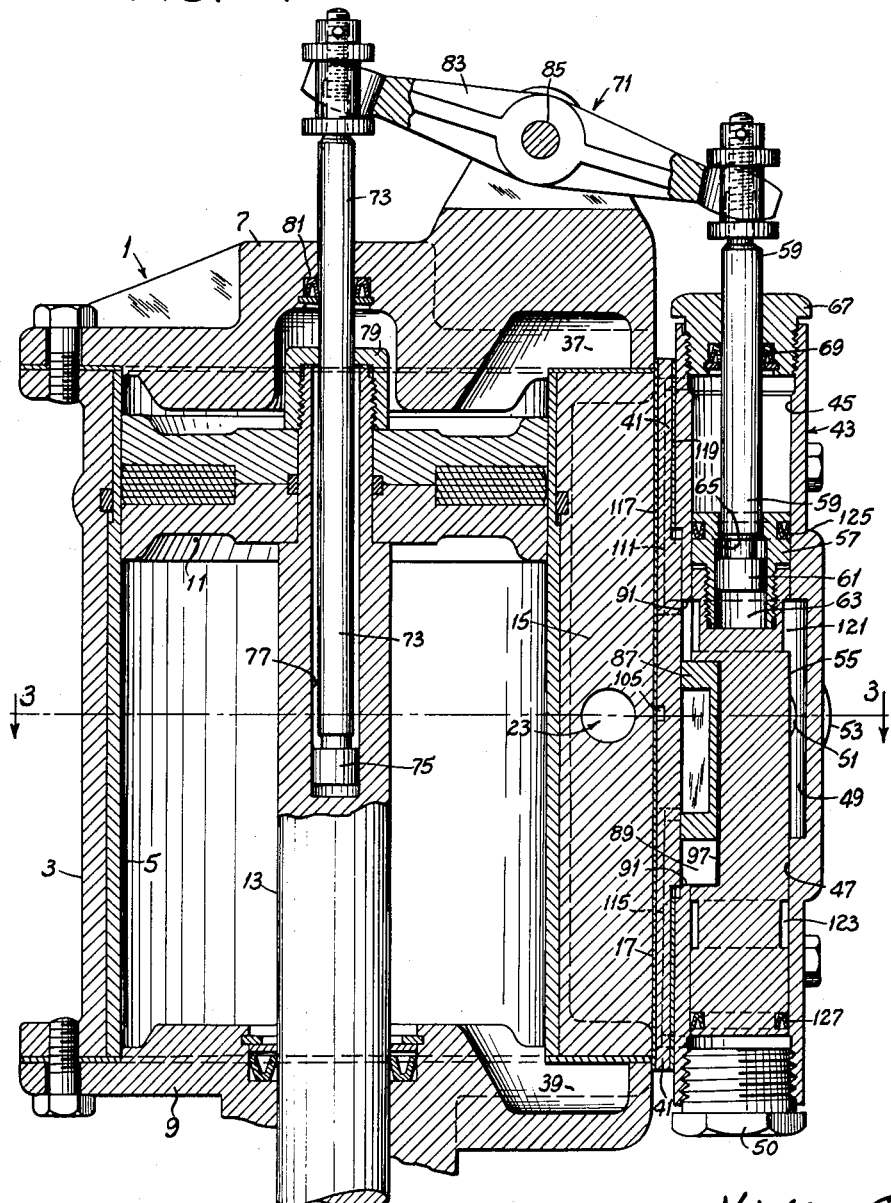
Fig. 2 is a central longitudinal section taken on line 2—2 of Fig. 1, illustrating parts in the position occupied during a downstroke of the piston of the motor.
Figure 4:
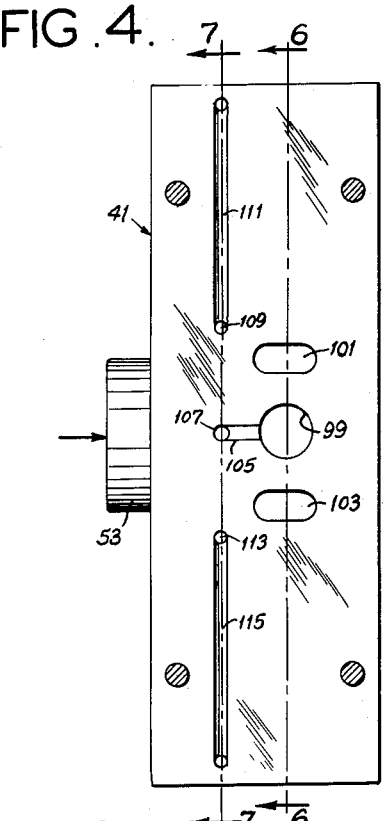
Fig. 4 is a section taken on line 4—4 of Fig. 1, showing the bottom of a valve plate of the valve mechanism.
Figure 5:
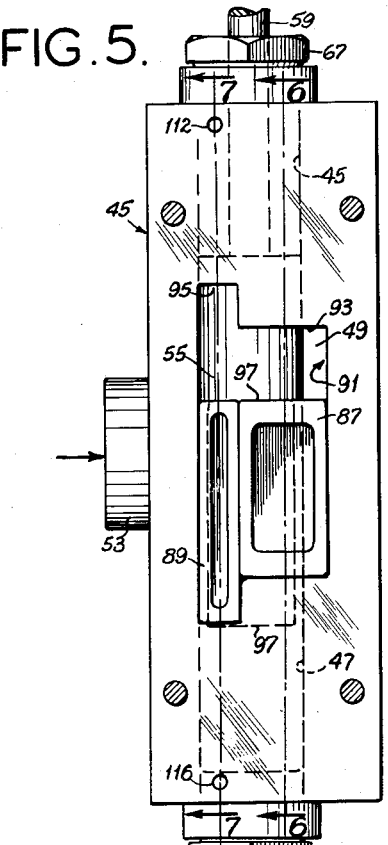
Fig. 5 is a section taken on line 5—5 of Fig. 1, showing the bottom of a valve chest of the valve mechanism.

Referring to the drawings, reference character 1 designates an expansible chamber motor, and specifically an air motor, provided with a valve mechanism of this invention. The motor comprises a cylinder 3 (shown in vertical position) having a liner 5 and upper and lower end heads 7 and 9. A piston 11 reciprocates in the cylinder. The piston is fixed on the upper end of a piston rod 13 which extends through the lower head 9 as shown in Fig. 2 and which is utilized to drive a lubricant pump, such as a so-called lance-type pump, or the like (not shown). On one side the cylinder has a lengthwise boss or block 15 having a flat outer face 17. In this boss or block are the usual feed passages 19 and 21 and the usual exhaust passage 23 (see Figs. 3, 6, 8 and 10). The exhaust passage is formed by a hole 25 bored completely transversely across the boss centrally of the length of the boss and a radial hole 27 bored in from the face 17 of the boss to an intersection with the transverse hole 25. The feed passage 19 is formed by a longitudinal hole 29 bored in from the upper end of the boss to a point short of the hole 25 and by a radial hole 31 bored in from the face 17 of the boss to an intersection with the lower end of hole 29. The feed passage 21 is formed by a longitudinal hole 33 bored in from the lower end of the boss to a point short of the hole 25 and by a radial hole 35 bored in from the face 17 of the boss to an intersection with the upper end of hole 33. Holes 29 and 33 open into recesses 37 and 39 in the upper and lower ends heads 7 and 9, respectively.

On the face 17 of the boss or block 15 is fixed a ported and passaged valve member 41, specifically a flat plate, and on this valve plate 41 is fixed a valve chest 43 for containing the pressure fluid (specifically air) for operating the motor. The chest comprises an elongate block of generally rectangular cross section somewhat longer than the boss 15. In the upper and lower ends of the block are longitudinal cylindrical bores 45 and 47, respectively, open to an enlarged central pressure chamber 49. The outer end of the bore 47 (its lower end) is closed against escape of pressure fluid by a plug 50. Pressure fluid is supplied to the pressure chamber 49 through a side inlet 51 in a side boss 53 on the chest. An elongate cylindrical double-ended piston 55 reciprocates in the chest lengthwise of the motor cylinder, being sealingly slidable at its ends in the bores 45 and 47 between the limiting end positions shown in Figs. 6 and 10 in each of which its ends remain in sealing relation in the bores. Threaded in a bore in the upper end of the piston 55 is a fitting 57 providing a lost-motion connection between the lower end of a piston-actuating rod 59 and the piston 55. The rod 59 has a head 61 at its lower end slidable in a bore 63 in the fitting 57. The rod extends out of the fitting 57 through an opening smaller than the bore 63, and the head 61 is engageable with a shoulder 65 at the upper end of the bore for lifting the piston. The rod 59 extends out of the upper end of the chest through an opening in an end closure 67 for the bore 45. Packing for the rod 59 is indicated at 69.

The rod 59 is a part of valve gear generally designated 71 for operating the piston 55 from the motor piston 11. This valve gear 71 includes a rod 73 having an enlarged head 75 at its lower end slidable in a bore 77 in the upper end of the motor piston rod 13. A cap 79 threaded on the upper end of the piston rod 13 above the piston 11 holds the piston 11 on piston rod 13 and has an opening for passage of the rod 73 but not of the head 75 to provide a lost-motion connection between the rod 73 and the rod 13. The rod 73 extends out of the motor cylinder through an opening in the upper end head 7. Packing for the rod 73 is shown at 81. The upper end of the rod 73 is coupled to one end of a rocker 83 pivoted at 85 on end head 7. The upper end of rod 59 is coupled to the other end of the rocker. The arrangement is such that near the end of a downstroke of the motor piston 11, cap 79 engages the head 75 on rod 73, pulls rod 73 down, rocks the rocker 83 counterclockwise as viewed in Fig. 2, pulls up the rod 59, and thus pulls the piston 55 up from the lowered position shown in Figs. 2, 6 and 7. Near the end of an upstroke of the piston 11, the bottom of the bore 77 engages the head 75 on rod 73, pushes the rod 73 up, rocks the rocker 83 clockwise, pushes down the rod 59, and thus pushes the piston 55 down from the fully raised position shown in Figs. 10 and 11.

The piston 55 controls a main distributing valve 87, specifically a slide valve of D-form, for controlling the supply and exhaust of pressure fluid to and from the opposite ends of the motor cylinder, and also controls an auxiliary distributing valve 89, also a slide valve of D-form, located side-by-side with respect to the main D-valve 87, for in turn controlling the supply and exhaust of pressure fluid to and from the outer ends of the bores 45 and 47 in the valve chest 43. In that side of the valve chest which is secured against the valve plate 41 is a valve-accommodating opening 91 in which the two D-valves 87 and 89 are slidable lengthwise of the motor cylinder in engagement with the valve plate. The main D-valve 87, as shown, is relatively short and wide as compared to the auxiliary D-valve 89, the latter being relatively long and narrow. The opening 91 is shaped somewhat like a T, having a relatively short wide portion 93 accommodating the sliding of the main D-valve 87 and a longer narrow portion 95 accommodating the sliding of the auxiliary D-valve 89. The two D-valves are guided by the sides of the opening 91. The piston 55 has a notch 97 corresponding in length to the length of the auxiliary D-valve 89. This notch receives the auxiliary D-valve without lost-motion, and receives the shorter main D-valve 87 with lost-motion (compare Figs. 6 and 7). Engagement of the ends of the auxiliary D-valve 89 with the ends of portion 95 of opening 91 determines the limiting end positions of the piston 55 shown in Figs. 6 and 10.

In the line of motion of the main D-valve 87, the valve plate 41 has a main central exhaust port 99 aligned with the hole 27 of exhaust passage 23 in the boss 15, a main feed port 101 above 99 aligned with the hole 31 of feed passage 19 and a main feed port 103 below 99 aligned with the hole 35 of feed passage 21 (see Figs. 4, 6, 8 and 10). The valve plate also has a passage 105 leading from a centrally located auxiliary exhaust port 107 in the line of motion of the auxiliary D-valve 89 to the port 99 (see Figs. 3 and 4). The valve plate further has an auxiliary feed port 109 in the line of motion of the auxiliary D-valve above the port 107 and a passage 111 leading from port 109 to a port 112 in the valve chest 43 at the upper end of bore 45 above the piston 55, and an auxiliary feed port 113 in the line of motion of the auxiliary D-valve below the port 107 and a passage 115 leading from port 113 to a port 116 in the valve chest at the lower end of bore 47 below the piston 55 (see Figs. 4, 7, 9 and 11). Between the face 17 of the boss or block 15 and the valve plate and between the valve plate and the chest are gaskets 117 and 119, respectively.

The piston 55 has upper and lower annular grooves 121 and 123, respectively. The upper groove 121 provides for communication from the pressure chamber 49 via port 101 in valve plate 41 to the feed passage 19 when the piston 55 is in its lowermost position shown in Figs. 2, 6 and 7. The lower groove 123 provides for communication from the pressure chamber via port 103 in the valve plate 41 to the feed passage 21 when the piston 55 is in its uppermost position shown in Figs. 10 and 11. In an annular groove in the fitting 57 is a V-section packing ring 125, and in an annular groove adjacent the lower end of the piston 55 is a V-section packing ring 127.

Operation is as follows:

Assuming that the motor piston 11 is starting a downstroke, the parts will be in the position shown in Figs. 2, 6 and 7. The piston 55 is in its lowermost position, there being some space between its lower end and the plug 50 in this position. The main D-valve 87 occupies the lowermost position best shown in Fig. 6 wherein it establishes communication from the pressure chamber 49 via port 101 in valve plate 41 to the feed passage 19 to supply pressure fluid from the chamber to the motor cylinder above the motor piston 11, and wherein it establishes communication from the feed passage 21 via ports 103 and 99 in the valve plate to the exhaust passage 23, thereby venting the motor cylinder below the piston 11. In this position of the main D-valve, it is engaged against the upper end of the notch 97 in the piston 55. The auxiliary D-valve 89 occupies the position shown in Fig. 7 wherein it establishes communication from the pressure chamber 49 via port 109 in the valve plate and passage 111 and port 112 to the upper end of bore 45 to hold the piston 55 down, and wherein it establishes communication from the lower end of bore 47 via port 116, passage 115, port 113, port 107, passage 105 (see Fig. 3) and port 99 in the valve plate to the exhaust passage 23, thereby to vent the bore 47 below the piston 55.

As the motor piston 11 reaches the lower end of its stroke, the cap 79 engages the head 75 on rod 73 and pulls rod 73 down, thereby rocking the rocker 83 counterclockwise and pulling up rod 59 and the piston 55. As the piston 55 moves upward, the auxiliary D-valve 89 is moved upward (being locked in the notch 97 in the piston), but the main D-valve 87 remains in its lowermost position by reason of its lost-motion arrangement in the notch 97 until the piston has moved upward to the intermediate position shown in Fig. 8 where the shoulder at the lower end of the notch 97 first engages the main D-valve. This lost motion permits the motor piston 11 to complete its downstroke. As the piston 55 moves somewhat farther upward from the intermediate position shown in Fig. 9, the auxiliary D-valve reaches a position wherein it establishes communication from the pressure chamber 49 via port 113, passage 115 and port 116 to the bore 47 below the lower end of piston 55, and wherein it establishes communication from the upper end of bore 45 via port 112, passage 111, port 109, port 107, passage 105 (see Fig. 3), and port 99 to the exhaust passage 23, thereby to vent the bore 45 above the piston. The result of this is that piston 55 is snapped upward by pressure in the bore 47 below the lower end of the piston to its raised position shown in Figs. 10 and 11. This snap movement of the piston 55 to its raised position by pressure independently of the mechanical linkage is permitted by the lost-motion connection between the rod 59 and the piston 55.

As the piston 55 snaps upward, the main D-valve is snapped upward to its raised position shown in Fig. 10 wherein it establishes communication from the pressure chamber 49 via port 103 in the valve plate 41 to the feed passage 21 to supply pressure fluid from the chamber to the motor cylinder below the motor piston 11, and wherein it establishes communication from the feed passage 19 via ports 101 and 99 in the valve plate to the exhaust passage 23, thereby venting the motor cylinder above the motor piston. Thus, the motion of the motor piston is reversed and it starts its upstroke, with a quick cutoff by reason of the snap action of the piston 55 and the main D-valve. During the upstroke of piston 11, the rod 73 remains in a down position, and the lost-motion connection between the rod 73 and the piston rod 13 allows for the motion of piston 11 independently of the rod 73.

In the raised position of the piston 55, the auxiliary D-valve occupies the raised position shown in Fig. 11 wherein it maintains the supply of pressure to the bore 47 below the lower end of the piston and vents the bore 45 above the piston thereby to maintain the piston in raised position. As the motor piston 11 reaches the upper end of its stroke, the bottom of bore 77 engages the head 75 on rod 73, pushes the rod 73 up, rocks the rocker 83 clockwise, pushes down the rod 59, and thus pushes down the piston 55. As the piston 55 is thus pushed downward, the auxiliary D-valve 89 is moved downward (being locked in the notch 91 in the piston), but the main D-valve remains in its Fig. 10 raised position by reason of its lost-motion arrangement in the notch 97 until the piston 55 has moved downward to the point where the shoulder at the upper end of notch 97 engages the main D-valve. This lost motion permits the motor piston 11 to complete its upstroke. As the piston 55 moves somewhat farther downward, the auxiliary D-valve reaches a position wherein it establishes communication from the pressure chamber 49 via port 109, passage 111 and port 112 to the upper end of the bore 45 above the piston 55, and vents the bore 47 below the piston 55 via port 116, passage 115, port 113, port 107, passage 105, port 99 and exhaust passage 23. The result of this is that the piston 55 is snapped down by pressure in bore 45 to its lowermost position shown in Figs. 2, 6 and 7. This downward snap movement of the piston 55 to its lowermost position by pressure independently of the mechanical linkage is permitted by the lost-motion connection between rod 59 and the piston.

As the piston 55 snaps downward, the main D-valve is snapped downward to its lowermost position shown in Figs. 2 and 6 wherein it feeds pressure to the motor cylinder above motor piston 11 and vents the motor cylinder below piston 11 for the downstroke of piston 11. Again, the reversal is effected with a quick cutoff by reason of the snap action of the piston 55 and the main D-valve. The auxiliary D-valve is snapped to its Fig. 7 position, and the cycle is repeated.

It will be noted that there is relatively low frictional resistance to movement of the piston 55. The only packings for this piston are the V-section rings 125 and 127, and these impose relatively low frictional resistance to piston movement. Accordingly, the valve mechanism may be operated under relatively low pressure conditions, and wear is reduced for longer life.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Valve mechanism for an expansible chamber motor, said motor comprising a cylinder having end heads, and a motor piston in the cylinder fixed on a piston rod, said valve mechanism comprising a block extending between the end heads at one side of the cylinder, said block having a flat outer face and a central exhaust passage with an exhaust hole thereto from said face, and feed passages extending longitudinally of the block from points adjacent opposite sides of the exhaust passage and open at the ends of the block to the opposite ends of the cylinder with feed holes thereto from said face on opposite sides of said exhaust hole, a valve plate secured on said face in sealed relation thereto, a valve chest secured in sealed relation overlying the valve plate, said valve chest having aligned piston-receiving bores at its opposite ends with a chamber for pressure fluid between the bores, the outer end of one bore being completely closed, a valve-actuating piston slidable at its ends in the bores between limiting end positions in each of which its ends remain in the bores, a valve-actuating piston rod having a lost-motion connection with the end of the valve-actuating piston toward the outer end of the other bore, the valve-actuating piston rod extending out of the valve chest through an opening in a closure at the outer end of said other bore, a main D-valve having a lost-motion connection with the valve-actuating piston slidable on the valve plate within the valve chest, an auxiliary D-valve alongside the main D-valve locked to the piston and slidable on the plate within the valve chest, the valve plate having a central main exhaust port in the line of motion of the main valve and aligned with said exhaust hole, main feed ports in said line of motion on opposite sides of the main exhaust port and aligned with said feed holes, a central auxiliary exhaust port in the line of motion of the auxiliary valve, auxiliary feed ports in the line of motion of the auxiliary valve on opposite sides of the auxiliary exhaust port, said valve mechanism further including passages connecting the auxiliary feed ports and the ends of said bores, a rod slidable in the motor piston rod having a lost-motion connection therewith and extending out of the cylinder, and means connecting the last-named rod and the valve-actuating piston rod.

2. Valve mechanism as set forth in claim 1 wherein the motor piston extends out of the cylinder through one end head, and the rod which is slidable in the motor piston rod extends out of the cylinder through the other end head, and wherein the means connecting the last-named rod and the valve-actuating piston rod comprises a rocker pivoted on said other end head and having its ends connected to said last-named rod and the valve-actuating piston rod.

References Cited in the file of this patent

UNITED STATES PATENTS

| | | |
|---|---|---|
| 94,973 | Post | Sept. 21, 1869 |
| 167,408 | Paddack | Sept. 7, 1875 |
| 252,084 | Dow | Jan. 10, 1882 |
| 263,785 | Hubbard | Sept. 5, 1882 |
| 290,063 | Kessler | Dec. 11, 1883 |
| 309,610 | Dow | Dec. 23, 1884 |
| 380,888 | Hanscom | Apr. 10, 1888 |
| 1,056,115 | Mumford et al. | Mar. 18, 1913 |
| 1,063,904 | Anthony | June 3, 1913 |
| 2,635,586 | Kuhn | Apr. 21, 1953 |

FOREIGN PATENTS

| | | |
|---|---|---|
| 478 | Great Britain | Feb. 22, 1862 |